No. 689,716. Patented Dec. 24, 1901.
P. HALLOT.
RAILWAY BRAKE.
(Application filed July 9, 1901.)
(No Model.) 3 Sheets—Sheet 1.

Witnesses.

Inventor.
Paul Hallot.
By James L. Norris.
Atty.

No. 689,716. Patented Dec. 24, 1901.
P. HALLOT.
RAILWAY BRAKE.
(Application filed July 9, 1901.)
(No Model.) 3 Sheets—Sheet 2.

Witnesses.

Inventor.
Paul Hallot.
By James L. Norris.
Atty

No. 689,716. Patented Dec. 24, 1901.
P. HALLOT.
RAILWAY BRAKE.
(Application filed July 9, 1901.)

(No Model.) 3 Sheets—Sheet 3.

Witnesses. Inventor.
Paul Hallot.
By James L. Norris.
Att'y.

UNITED STATES PATENT OFFICE.

PAUL HALLOT, OF VINCENNES, FRANCE.

RAILWAY-BRAKE.

SPECIFICATION forming part of Letters Patent No. 689,716, dated December 24, 1901.

Application filed July 9, 1901. Serial No. 67,667. (No model.)

*To all whom it may concern:*

Be it known that I, PAUL HALLOT, a citizen of France, residing at 79 Rue de Fontenay, Vincennes, France, have invented certain new and useful Improvements in Railway-Brakes, of which the following is a specification.

This invention relates to improvements in continuous friction-brakes specially designed for use on long goods-trains; and in order that the invention may be readily understood I will describe the same fully with reference to the annexed drawings, in which—

Figure 1:
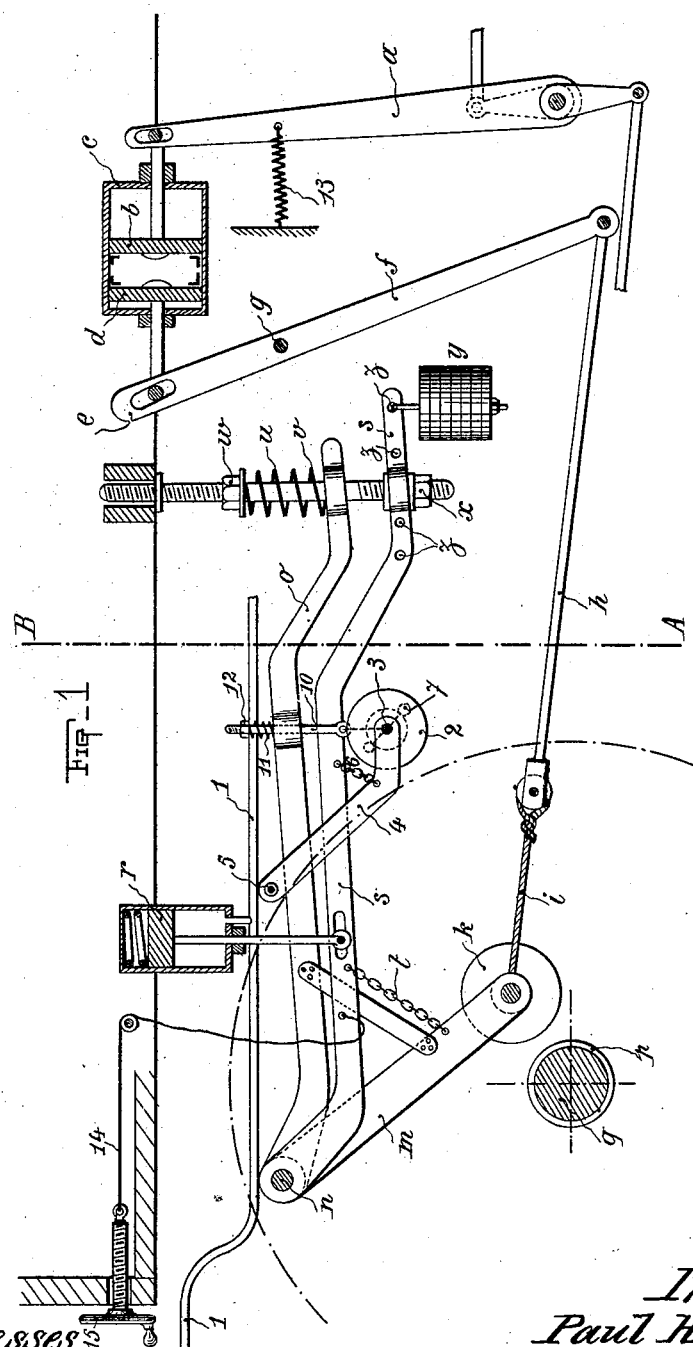
Figure 2:
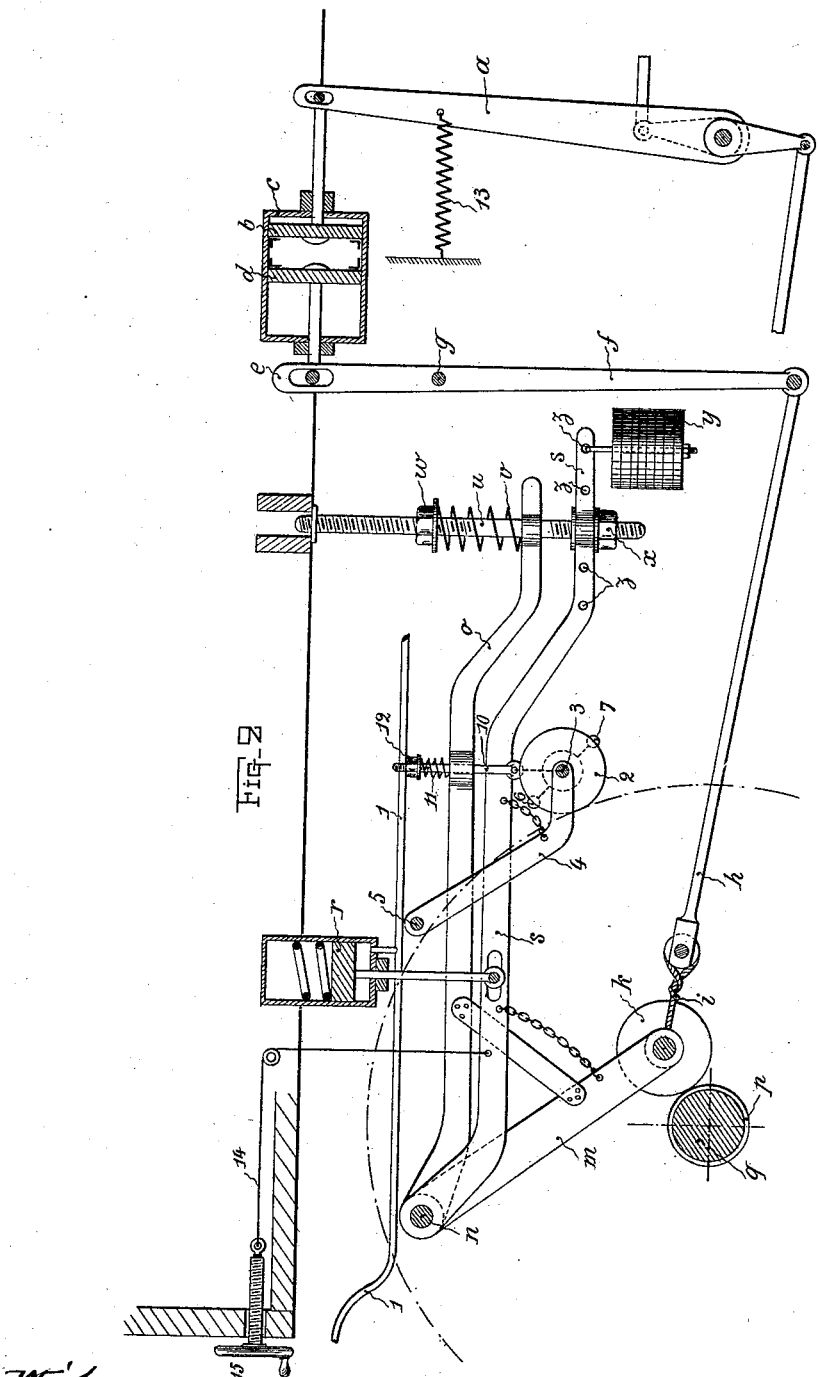
Figure 3:
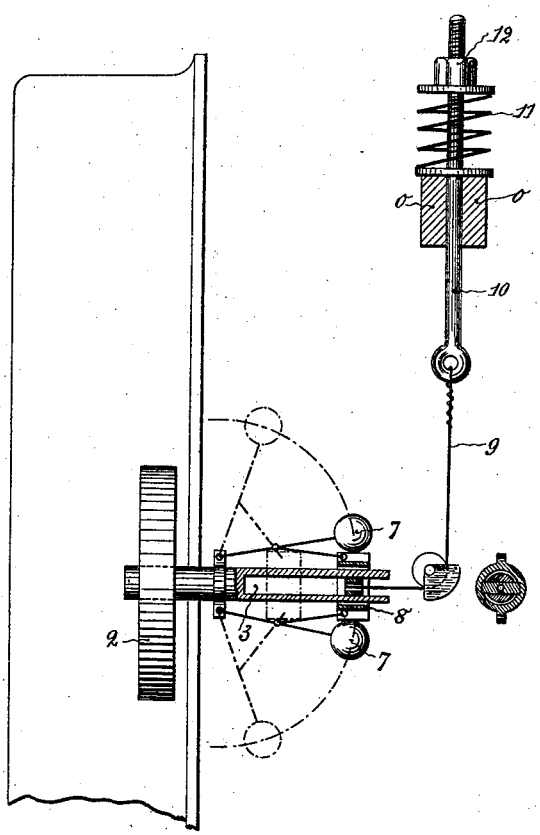

Figure 1 is a diagrammatic elevation of the brake "off." Fig. 2 is a similar view, but with the brake "on." Fig. 3 is a partial rear view, on a larger scale, taken on the line A B of Fig. 1.

The brake-blocks are worked by an ordinary brake mechanism set in action by the lever $a$, connected to a piston $b$, which works in the fixed cylinder $c$ at the same time as another piston $d$. The piston-rod $d$ is connected in any suitable manner to the end $e$ of a powerful lever $f$, having its axis of rotation $g$ fixed to the frame of the vehicle or truck. The other end of this lever $f$ is connected by a draw-rod $h$ to a flexible rope $i$, capable of winding itself in one or other direction according to the travel of the vehicle upon an axle driven by a friction-roller $k$. Said friction-roller is mounted at the end of a connecting-bar $m$, which is loose on the axle $n$ and is rigidly connected to a lever $o$. By causing this lever $o$ and the connecting-bar $m$ to pivot about the axle $n$ the friction-roller $k$ can be brought into contact with a sleeve $p$, keyed upon the axle $q$ of the vehicle-wheel. The sleeve $p$ is not so hard as the friction-roller $k$, and hence it can be easily renewed or replaced, this arrangement being adopted in order that any wear may take place on the sleeve, so that the friction-roller $k$ shall always remain quite round and not become flat.

The movements of the parts $o$ $m$ $k$ about the fixed axle $n$ are obtained by means of an auxiliary lever $s$, connected to the rod of a piston $r$, working in a vertical cylinder fixed to the frame. This lever $s$ also turns loosely about the axle $n$. It is attached near one end to the connecting-bar $m$ by a flexible connection $t$—for instance, a chain—and near the other end to the lever $o$ by a rod $u$ and a powerful spring $v$, the nuts $w$ and $x$ of which permit of the initial tension being adjusted or regulated.

A counterweight $y$ may be hooked into one or other of the holes $z$ formed in the end of the lever $s$.

A main pipe 1 establishes communication between the lower face of the piston $r$ and the reservoir of compressed air carried by the engine.

There is a second friction-roller 2, Fig. 3, of steel like the rails, so that the coefficient of adhesion between this friction-roller and the tire of the wheel against which it is brought has always the same value as the coefficient of adhesion between the rail and the wheel. This friction-roller 2 is fixed on a shaft 3, carried by a connecting-bar 4, which turns about the axle 5, fixed to the frame, and which is connected to the auxiliary lever $s$ by a flexible connection 6, analogous to the chain $t$. On the shaft 3 is arranged a centrifugal force-multiplying apparatus 7, constructed like a speed-governor, but the object of which is to transform, proportionately to the adhesion and the speed of the train at the moment, the live force due to the rotation of the friction-roller 2 into a downward pull on the lever $o$. For this purpose the collar 8, which moves along the shaft 3 when the balls diverge by the effect of centrifugal force, is connected by a flexible cord 9 to a rod 10, which passes through the lever $o$ and which can bear on this lever through the intervention of a spring 11 and nut 12.

The working of the brake is as follows: Normally there exists in the pipe 1 a pressure of, say, four kilograms, this pressure balancing the weight of the lever $s$ and the friction-rollers $k$ and 2, which the chains $t$ and 6 keep off the sleeve $p$ and the tire of the wheel, as seen in Fig. 1. If the engineman causes a fall of pressure in the pipe 1 to the extent of, say, eight hundred grams, the piston $r$ descends and the friction-roller $k$ is brought against and rolls upon the sleeve $p$ with a pressure which is due solely to the weight of the axle and of the levers $m$ and $o$. This rotation of the friction-roller $k$ causes the rope $i$ to wind up and the lever $f$ to pivot and push backward the piston $d$ toward the right, and consequently the piston $b$ also. This movement continues until the brake-blocks are applied to the wheels, at which moment equilibrium is established between the tension of the rope $i$ and the reaction of the brake mechanism, and the friction-roller $k$ ceases to turn while remaining pressed against the sleeve $p$. The lever $o$ falling to the same extent as the lever $s$, the spring $v$ has therefore not been compressed. If the engineman continues reducing the air-pressure and brings, for instance, the pressure from three kilograms two hundred grams to three kilograms, the piston $r$ descends further, being carried down by the respective weights of the lever $s$, the multiplying apparatus, and the counterweight $y$. The lowering of the nut $x$ and of the rod $u$ has the effect of slightly compressing the spring $v$ between the nut $w$ and the lever $o$, which is fixed, since the friction-roller $k$ rests upon the sleeve $p$ of the axle $q$, and of bringing, with a gradually-increasing force of adhesion, the friction-roller 2 into contact with the tire of the wheel, such contact communicating to it a speed of rotation the more rapid as the travel of the train is the quicker and as the adhesion at the moment is the more considerable. This rotation causes the balls 7 to diverge and advance the collar 8 toward the left, and consequently to exert a powerful pull on the rod 10 and the lever $o$, Fig. 3. The pressure of the friction-roller $k$ on the sleeve $p$ is by this fact increased in the proportion suitable to insure a fresh working of the friction-roller until the brake-blocks are applied against the wheel with the required force. Equilibrium is then established as previously and the rotation of the friction-roller ceases. If the engineman still further lowers the pressure from three kilograms to two kilograms five hundred, for instance, the lever $s$ will fall more and more and will bear, through the medium of the rod $u$ and the spring $v$, upon the end of the lever $o$, which thereby increases proportionally the pressure of the brake-blocks. Consequently for each degree of pressure in the pipe 1 there is a corresponding definite position of the parts of the brake, a proportional compression of the air in the cylinder $c$, and hence a likewise definite degree of the pressure of the brake-blocks against the wheels. Fig. 2 shows the parts when the brake is firmly applied or "hard on." A moment will come when the speed of the train slackening and the pressure on the blocks going on increasing the retarding force which results therefrom will become equal to the adhesion of the wheels on the rail, and at this moment the rotation of the wheels will tend to decrease until stoppage is effected. They would then be skidded; but this skidding of the wheels must be carefully avoided for two principal reasons: first, it produces flats on the wheels; second, the retarding force applied to the train is, as is known, diminished by one-half. In the hitherto-known systems of brakes the skidding is avoided by purposely keeping the force which applies the blocks lower than that which brings about the skidding under the condition in which this latter is the more easily produced—that is to say, in wet weather and with the vehicle empty or only slightly laden. Such brakes do not therefore utilize all the power of which they are capable. In the present arrangement, according to this invention, this defect is obviated, for so soon as the wheels slacken their motion the force which urges the collar 8 toward the left diminishes and said collar moves back again toward the right. Hence the pressure upon the lever $o$ and the roller $k$ is diminished and the same takes place with the pressure of the brake-blocks against the wheels. These latter will therefore never become immovable even though being continually braked with the maximum force permitted by the state of the rails and the load of the vehicle at each point of the journey and that automatically. To take off the brakes, the engineman reëstablishes the required pressure in the pipe 1 and the lever $s$ rises, gradually diminishing the pressure on the friction-roller $k$ and carrying away successively the friction-roller 2 and the friction-roller $k$, at which time the spring 13 restores the brake.

As seen, the compressed air serves only to control the brakes. It can be replaced by any other suitable agent, such as electricity, vacuum, steam, &c. The vehicles or trucks may be readily braked either during the journey or when they are detached by substituting for the action of the piston $r$ a rope 14, operated by any suitable means—such, for example, as a hand-wheel 15.

The action of the brakes is proportional to the load of the vehicle, for the more the vehicle is loaded the nearer the piston $r$ of the cylinder will approach the axle, which, for a given decrease of pressure, causes a greater compression of the spring $v$ and increases the play available for the descent of the piston $r$. The counterweight $y$ also permits of the action of the brake being graduated according to circumstances and according to the number of vehicles in the train which have no brakes.

This brake is inexpensive, is very powerful, although consuming but very little compressed air, does not comprise any delicate part, gives the maximum pressure on the wheels compatible with the adhesion at each instant without ever permitting the wheels to become skidded, is capable of moderation both when being "put on" and "taken off," is automatic in its working in the event of rupture of the coupling and in case of insufficient pressure in the main reservoir, and is capable of acting as an independent brake. It is also to be understood that there can be applied to this system of brake any modifications which would contribute to its working. In particular the length of the chain 6 could be such that the multiplying apparatus 7 would not come into action until after the total or partial compression of the spring $v$. Furthermore, the air-cushion of the cylinder $c$ could be replaced by any other elastic resisting medium.

As the pressure on the brake-blocks which effects the braking is proportional to the adhesion at the moment the pressure can be further increased by increasing the coefficient of adhesion by arranging on each vehicle a suitable sand-distributer, which would only come into action when the engineman had caused a reduction of pressure in the cylinder to zero, as in the case of emergency stoppages. The distribution of the sand under the wheels of each vehicle can be effected in any suitable manner by connecting the valve of the sand-distributer to any one of the parts of the brake—for instance, to the rod of the piston $r$ or to that of the piston $d$ or even to one of the levers $s$ or $o$.

What I claim is—

1. In a brake for vehicles, a member adapted to be actuated by being brought into frictional contact with a movable part of said vehicle, a second and similarly-operable member, brake mechanism governed by the first member, and means operative with the second member for controlling the first one.

2. In a brake for vehicles, a member adapted to be actuated by being brought into frictional contact with a movable part of said vehicle, a second and similarly-operable member, brake mechanism governed by the first member, and means operative with the second member for controlling the first one, said means including a centrifugal governor.

3. In a brake for vehicles, a friction-wheel and its carrier, the friction-wheel being adapted for rotation by a wheel of said vehicle, a second friction-wheel similarly operable, means operable with the second friction-wheel for controlling the contact between the first friction-wheel and the vehicle-wheel and brake mechanism governed by the first friction-wheel.

4. In a brake for vehicles, a friction-wheel and its carrier, the friction-wheel being adapted for rotation by a wheel of said vehicle, a second friction-wheel similarly operable, means operable with the second friction-wheel for controlling the contact between the first friction-wheel and the vehicle-wheel, a flexible connection adapted to be wound up by the first friction-wheel, and brake mechanism connected with said flexible connection.

5. In a brake for vehicles, a friction-wheel, a cylinder having a piston, a lever connected to said piston, connections between the lever and the friction-wheel including a flexible connection adapted to be wound up by the friction-wheel, manually-governed means for controlling the motion of the friction-wheel, a second piston in said cylinder, and brake mechanism operative by the latter.

6. In a brake for vehicles, a friction-wheel, a cylinder having a piston, brake mechanism connected with said piston, a friction-wheel operable by a wheel of the vehicle, a second piston in said cylinder connected with said friction-wheel, a second friction-wheel operable like the other one, a centrifugal governor operative with the second friction-wheel and coöperative with and adapted to coact with the first friction-wheel.

7. In a brake for vehicles primary and secondary friction-wheels, brake mechanism actuated by the primary friction-wheel and mechanism including a centrifugal speed-governor operable by the secondary friction-wheel for controlling the primary friction-wheel.

8. In a brake for vehicles, a friction-wheel, brake mechanism operable by said friction-wheel, a carrier for said friction-wheel, a lever connected with said carrier, a second lever flexibly connected to said carrier, a second friction-wheel and its carrier the latter being flexibly connected with said second lever, a rod uniting the levers and having a cushioning device bearing against one of them, a centrifugal speed-governor operable by the second friction-wheel, and a rod actuated by the governor and yieldingly bearing against the first lever.

9. In a brake for vehicles, a friction-wheel, a carrier for said friction-wheel, a lever connected with said carrier, a second lever flexibly connected to said carrier, a second friction-wheel and its carrier, the latter being flexibly connected with said second lever, a rod uniting the levers and having a cushioning device bearing against one of them, a centrifugal speed-governor operable by the second friction-wheel, a rod actuated by the governor and yieldingly bearing against the first lever, a cylinder containing two pistons one of which is connected with the first friction-wheel, and brake mechanism connected with the other piston.

10. In a brake for vehicles, a friction-wheel, a carrier for said friction-wheel, a lever connected with said carrier, a second lever flexibly connected to said carrier, a second friction-wheel and its carrier the latter being flexibly connected with said second lever, a rod uniting the levers and having a cushioning device bearing against one of them, a centrifugal speed-governor operable by the second friction-wheel, a rod actuated by the governor and yieldingly bearing against the first lever, a cylinder containing two pistons, a flexible connection arranged to be wound up by said first friction-roller and operatively connected with one of the pistons, brake mechanism connected with the other piston, and a second cylinder the piston of which is connected to said second lever.

In testimony whereof I have hereunto set my hand in presence of two subscribing witnesses.

PAUL HALLOT.

Witnesses:
EDWARD P. McLEAN,
ALFRED FREY.